(12) United States Patent
Igarashi et al.

(10) Patent No.: US 8,006,495 B2
(45) Date of Patent: Aug. 30, 2011

(54) SUPERCHARGING SYSTEM FOR INTERNAL COMBUSTION ENGINE

(75) Inventors: Osamu Igarashi, Susono (JP); Masakazu Tabata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 701 days.

(21) Appl. No.: 11/991,789

(22) PCT Filed: Jul. 26, 2006

(86) PCT No.: PCT/JP2006/315251
§ 371 (c)(1),
(2), (4) Date: Mar. 11, 2008

(87) PCT Pub. No.: WO2007/032157
PCT Pub. Date: Mar. 22, 2007

(65) Prior Publication Data
US 2008/0312803 A1    Dec. 18, 2008

(30) Foreign Application Priority Data
Sep. 15, 2005 (JP) ................................ 2005-268422

(51) Int. Cl.
*F02B 33/44* (2006.01)
*F02B 33/00* (2006.01)
(52) U.S. Cl. ...................................................... 60/608
(58) Field of Classification Search ............. 60/607–609
See application file for complete search history.

(56) References Cited

U.S. PATENT DOCUMENTS

| | | | |
|---|---|---|---|
| 4,508,090 A | 4/1985 | Rembold | |
| 5,680,763 A | 10/1997 | Unland et al. | |
| 5,906,098 A * | 5/1999 | Woollenweber et al. | 60/608 |
| 6,318,085 B1 | 11/2001 | Torno et al. | |
| 6,883,324 B2 * | 4/2005 | Igarashi et al. | 60/608 |
| 6,907,867 B2 * | 6/2005 | Igarashi et al. | 60/608 |

(Continued)

FOREIGN PATENT DOCUMENTS

DE    195 02 150 C1    5/1996

(Continued)

OTHER PUBLICATIONS

Aug. 31, 2010 Office Action issued in Japanese Patent Application No. 2005-268422 (with translation).

(Continued)

*Primary Examiner* — Thai Ba Trieu
(74) *Attorney, Agent, or Firm* — Oliff & Berridge, PLC (57) ABSTRACT

An object of the invention is to provide a technique for excellently controlling a supercharger equipped with an electric motor. A supercharging system for an internal combustion engine according to the present invention is provided with a supercharger equipped with an electric motor, where rotation of the rotary shaft of the supercharger is assisted by the electric motor, and control unit for controlling assisting force of said electric motor in such a way that the rotation speed of the supercharger becomes a target rotation speed. The control unit determines the target rotation speed of the supercharger based on any one of (1) the degree of opening of the accelerator, (2) the degree of opening of the accelerator and the rotation speed of the internal combustion engine, (3) the actual degree of opening of a throttle valve and the rotation speed of the internal combustion engine, and (4) the target degree of opening of the throttle valve and the rotation speed of the internal combustion engine, and controls the assisting force by the electric apparatus in such a way that the target rotation speed is attained.

2 Claims, 5 Drawing Sheets

U.S. PATENT DOCUMENTS

| | | | |
|---|---|---|---|
| 6,938,420 B2 * | 9/2005 | Kawamura et al. | 60/608 |
| 7,213,585 B2 * | 5/2007 | Yang | 123/543 |
| 7,530,229 B2 * | 5/2009 | Akita | 60/608 |
| 7,628,015 B2 * | 12/2009 | Marumoto et al. | 60/608 |
| 7,644,586 B2 * | 1/2010 | Yamagata | 60/612 |

FOREIGN PATENT DOCUMENTS

| | | |
|---|---|---|
| DE | 197 12 850 A1 | 10/1998 |
| DE | 103 06 600 A1 | 9/2003 |
| EP | 0 709 559 A1 | 5/1996 |
| EP | 1 391 595 A1 | 2/2004 |
| JP | A-4-232331 | 8/1992 |
| JP | A-05-231162 | 9/1993 |
| JP | B2-2782711 | 5/1998 |
| JP | A-2001-280145 | 10/2001 |
| JP | A-2003-239754 | 8/2003 |
| JP | A-2004-162648 | 6/2004 |
| JP | A-2004-176688 | 6/2004 |
| WO | WO 03/004847 A2 | 1/2003 |
| WO | WO 2005085610 A1 * | 9/2005 |

OTHER PUBLICATIONS

Oct. 11, 2010 Office Action issued in European Patent Application No. 06768406.8.

* cited by examiner

Fig. 5

SUPERCHARGING SYSTEM FOR INTERNAL COMBUSTION ENGINE

TECHNICAL FIELD

The present invention relates to a supercharging system for an internal combustion engine and particularly to a system including a supercharger equipped with electric motor that can assist rotation of the rotary shaft thereof.

BACKGROUND ARTS

Published Japanese Patent No. 2782711 discloses an internal combustion engine equipped with a supercharger having a function of raising the pressure of the intake air introduced into a cylinder to increase the output power. The supercharger equipped with electric motor has an electric motor built therein, and the output shaft of the electric motor constitutes the rotary shaft of the supercharger.

In the internal combustion engine disclosed in this Japanese Patent No. 2782711, the difference between the intake pipe pressure (boost pressure) corresponding to accelerator position and the current intake pipe pressure (boost pressure) detected by an intake pipe pressure (boost pressure) sensor provided in an intake passage is computed, and if it is determined that the difference is larger than a predetermined value, the electric motor is activated to increase the rotation speed of the rotary shaft of the supercharger to a desired rotation speed.

DISCLOSURE OF THE INVENTION

When controlling target supercharging pressure based on the intake pipe pressure, processing of smoothing fluctuations of the intake pipe pressure data is typically effected in order to eliminate influences of fluctuations in the intake pipe pressure, and therefore the transient response of the supercharger equipped with electric motor is lowered.

In diesel engines, the quantity of fuel supplied into the cylinder is conventionally controlled based on a value measured by the intake pipe pressure sensor. On the other hand, in gasoline engines, the quantity of fuel supplied into the cylinder is controlled based on a value measured by an air flow meter. Accordingly, the gasoline engines are not provided with an intake pipe pressure sensor, unlike diesel engines.

Therefore, if a supercharger equipped with electric motor is provided in a gasoline engine, the following disadvantage will arise. That is, in the case where the target supercharge control is performed based on the intake pipe pressure, it is needed to provide an intake pipe pressure sensor, which is not provided in conventional gasoline engines. This leads to an increase in the cost. In addition, in the case where only an intake pipe pressure sensor is provided, as is the case with diesel engines, and the supercharger equipped with electric motor as well as the quantity of fuel supplied into the cylinder is controlled based on a value measured by the intake pipe pressure sensor, a control logic different from that in engines that do not have a supercharger equipped with electric motor is needed. This leads to an increase the cost related to development.

The present invention has been made in view of the above described problems and has as an object to provide a technique for excellently controlling a supercharger equipped with electric motor.

To achieve the above object, according to the present invention, there is provided a supercharging system for an internal combustion engine including a supercharger equipped with an electric motor that performs supercharging utilizing the energy of the exhaust gas of the internal combustion engine mounted on a vehicle, where rotation of the rotary shaft of the supercharger is assisted by the electric motor, and control unit for controlling assisting force of the electric motor in such a way that the rotation speed of the supercharger becomes a target rotation speed, wherein the control unit determines the target rotation speed of the supercharger based on the degree of opening of an accelerator provided on the vehicle or on the degree of opening of the accelerator and the rotation speed of the internal combustion engine, and controls the aforementioned assisting force in such a way that the target rotation speed thus determined is attained.

By determining the target rotation speed of the supercharger based on the degree of opening of the accelerator provided on the vehicle or on the degree of opening of the accelerator and the rotation speed of the internal combustion engine and controlling the rotation speed of the supercharger in such a way as to attain the target rotation speed, it is possible to improve the transient response of the supercharger, since it is not necessary to perform processing of smoothing fluctuations of the intake pipe pressure data that has been conventionally performed when controlling the target supercharging pressure based on the intake pipe pressure.

According to another aspect of the present invention, there is provided a supercharging system for an internal combustion engine including a supercharger equipped with an electric motor that performs supercharging utilizing the energy of the exhaust gas of the internal combustion engine mounted on a vehicle, where rotation of the rotary shaft of the supercharger is assisted by the electric motor, and control unit for controlling assisting force of the electric motor in such a way that the rotation speed of the supercharger becomes a target rotation speed, wherein the control unit determines the target rotation speed of the supercharger based on the actual degree of opening of a throttle valve provided in an intake passage of the internal combustion engine and the rotation speed of the internal combustion engine and controls the aforementioned assisting force in such a way that the target rotation speed thus determined is attained.

By determining the target rotation speed of the supercharger based on the actual degree of opening of the throttle valve and the rotation speed of the internal combustion engine and controlling the rotation speed of the supercharger in such a way as to attain the target rotation speed, it is possible to improve the transient response of the supercharger, since it is not necessary to perform processing of smoothing fluctuations of the intake pipe pressure data that has been conventionally performed when controlling the target supercharging pressure based on the intake pipe pressure.

According to still another aspect of the present invention, there is provided a supercharging system for an internal combustion engine including a supercharger equipped with an electric motor that performs supercharging utilizing the energy of the exhaust gas of the internal combustion engine mounted on a vehicle, where rotation of the rotary shaft of the supercharger is assisted by the electric motor, and control unit for controlling assisting force of the electric motor in such a way that the rotation speed of the supercharger becomes a target rotation speed, wherein the control unit determines the target rotation speed of the supercharger based on a target degree of opening of a throttle valve provided in an intake passage of the internal combustion engine and the rotation speed of the internal combustion engine and controls the aforementioned assisting force in such a way that the target rotation speed thus determined is attained.

By determining the target rotation speed of the supercharger based on the target degree of opening of the throttle valve, which is determined based mainly on the degree of opening of the accelerator and the rotation speed of the internal combustion engine, and the rotation speed of the internal combustion engine and controlling the rotation speed of the supercharger in such a way as to attain the target rotation speed, it is possible to improve the transient response of the supercharger, since it is not necessary to perform processing of smoothing fluctuations of the intake pipe pressure data that has been conventionally performed when controlling the target supercharging pressure based on the intake pipe pressure.

In transient periods such as during acceleration, in particular, it takes a significant time for the actual degree of opening of the throttle valve to become equal to the target degree of opening of the throttle valve that is computed based on the degree of opening of the accelerator and the rotation speed of the internal combustion engine. Therefore, by determining the target rotation speed of the supercharger based on the target degree of opening of the throttle valve, it is possible to more precisely set a target rotation speed that is optimum for the engine condition.

According to still another aspect of the present invention, there is provided a supercharging system for an internal combustion engine including a supercharger equipped with an electric motor that performs supercharging utilizing the energy of the exhaust gas of the internal combustion engine mounted on a vehicle, where rotation of the rotary shaft of the supercharger is assisted by the electric motor, and control unit for controlling assisting force of the electric motor in such a way that the rotation speed of the supercharger becomes a target rotation speed, wherein the control unit determines the target rotation speed of the supercharger based on a target degree of opening of a throttle valve provided in an intake passage of the internal combustion engine and the rotation speed of the internal combustion engine during a predetermined period after start of assist by the electric motor, determines the target rotation speed of the supercharger based on the actual degree of opening of the throttle valve and the rotation speed of the internal combustion engine after said predetermined time has elapsed, and controls the aforementioned assisting force in such a way that the target rotation speed thus determined is attained.

The above described way of control is advantageous since it is considered that after the predetermined time has elapsed, the actual degree of opening of the throttle valve and the target degree of opening are equal to each other, and the target rotation speed can be determined more simply and faster based rather on the actual degree of opening of the throttle valve and the rotation speed of the internal combustion engine.

It is preferred that the aforementioned control unit be adapted to set the target rotation speed a little lower than the rotation speed of the supercharger in the state in which the internal combustion engine is running stationarily without assist by the electric motor. By this feature, it is possible to activate assist only when a turbo time lag occurs. Thus, it is possible to prevent excessive supercharge, excessive rotation and wasteful power consumption.

Furthermore, it is preferred that the aforementioned control unit be adapted to correct the target rotation speed based on the ambient atmospheric pressure. The lower the ambient atmospheric pressure is, the lower the oxygen concentration is. In view of this, for example in the case where the land on which the vehicle is traveling is high in altitude, the target rotation speed may be made higher than that in the case where the land on which the vehicle is traveling is low. In this way, by detecting the altitude of the land the vehicle is on based on the ambient atmospheric pressure and correcting the target rotation speed based on the altitude, it is possible to control the rotation speed more reliably and more appropriately.

It is also preferred that the aforementioned control unit be adapted to detect the knocking intensity occurring in the cylinder of the internal combustion engine and correct the target rotation speed based on the knocking intensity. For example, if the intensity of knocking occurring in the cylinder when the supercharger is running at the target rotation speed is high, the target rotation speed may be decreased. In this way, by detecting the knocking intensity occurring in the cylinder of the internal combustion engine and correcting the target rotation speed based on the knocking intensity, it is possible to improve the reliability.

As described in the foregoing, the supercharging system for an internal combustion engine according to the present invention can provide excellent control of a supercharger equipped with electric motor.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENT

In the following, the best mode for carrying out the present invention will be described in detail with reference to the drawings by way of example.

Embodiment 1

Figure 1:
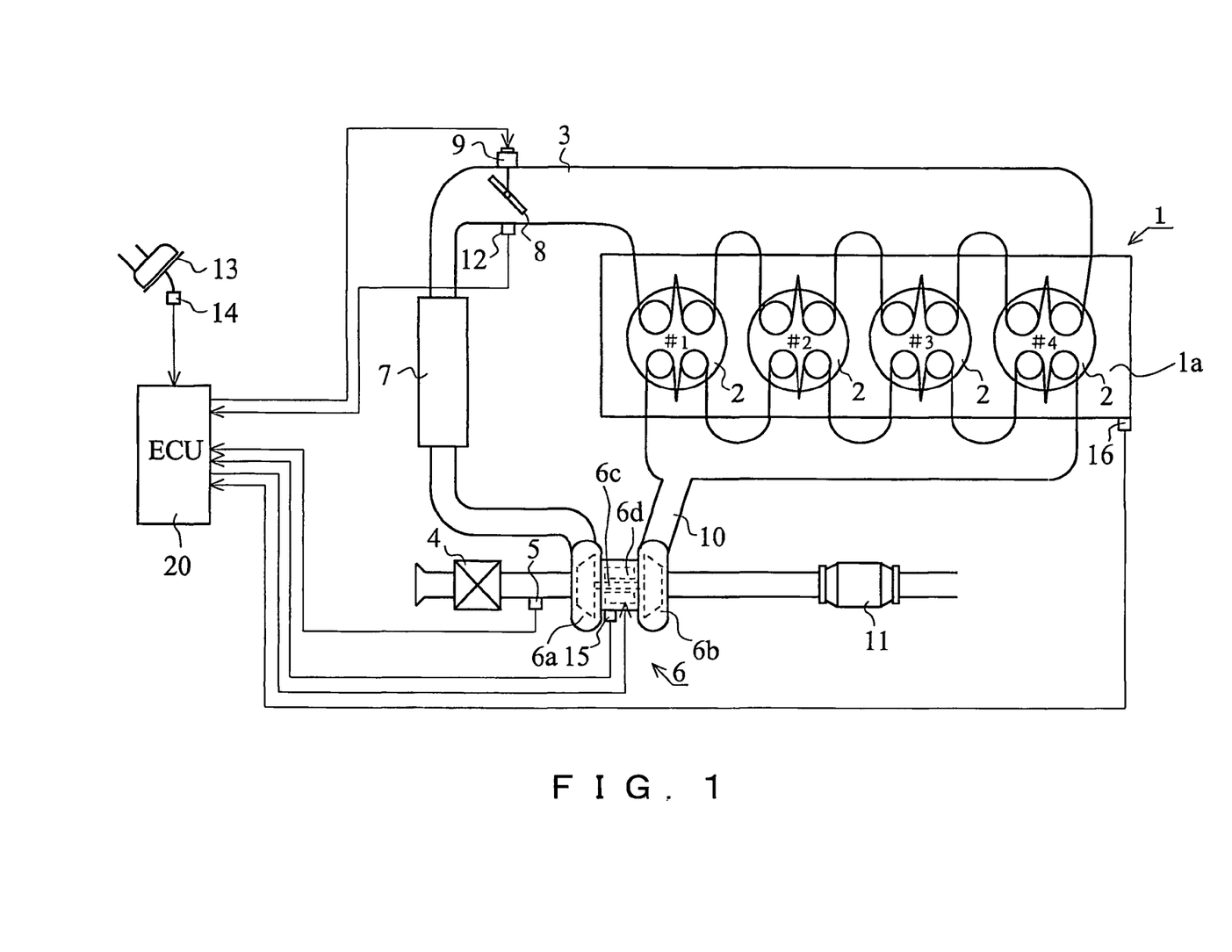
FIG. 1 is a diagram schematically showing the structure of an internal combustion engine and its air-intake and exhaust system according to an embodiment of the present invention.

FIG. 1 is a diagram schematically showing the structure of an internal combustion engine according to this embodiment and its air intake and exhaust systems. The internal combustion engine 1 shown in FIG. 1 is a water-cooled four-cylinder gasoline engine having four cylinders 2.

The internal combustion engine 1 is connected with an intake passage 3, which in turn is connected to an air cleaner box 4. An air flow meter 5 that outputs an electric signal indicative of the mass of the intake air flowing through the intake passage 3 is attached to the intake passage 3 downstream of the air cleaner box 4.

A compressor housing 6a of a supercharger (turbocharger) 6 is provided in such a way as to intervene in the intake passage 3. An intercooler 7 is attached on the intake passage 3 downstream of the compressor housing 6a. The supercharger 6 is one equipped with an electric motor, that is, an electric motor 6d is built in the supercharger 6 so that the output shaft of the electric motor 6d constitutes the rotary shaft 6c of the supercharger 6.

A throttle valve 8 that regulates the flow rate of the intake air passing through the intake passage 3 is provided in the intake passage 3 downstream of the intercooler 7. To the throttle valve 8 is attached an actuator 9 that opens/closes the throttle valve 8.

The exhaust gas discharged from the combustion chamber of each cylinder 2 flows through the exhaust passage formed by an exhaust port, an exhaust manifold 10 and the turbine housing 6b of the supercharger 6. The exhaust gas is purified by an exhaust gas purification catalyst 11 provided in the exhaust passage downstream of the supercharger 6 and then discharged into the atmosphere after passing through a muffler (not shown).

In the vicinity of the throttle valve 8, there is provided a throttle position sensor 12 that outputs an electric signal indicative of the degree of opening of the throttle valve 8. In the vicinity of the accelerator 13 of the vehicle on which the internal combustion engine 1 is mounted, there is provided an accelerator position sensor 14 that outputs an electric signal indicative of the degree of opening of the accelerator 13. In the vicinity of the rotary shaft 6c of the supercharger 6, there is provided a rotary shaft position sensor 15 that detects the rotational phase of the rotary shaft 6c. In the vicinity of the crankshaft (not shown) of the internal combustion engine 1, there is provided a crank position sensor 16 that detects the rotational phase of the crankshaft.

An electronic control unit (ECU) 20 is annexed to the internal combustion engine 1 and its air-intake and exhaust systems having the above described structure. The ECU 20 is an arithmetic and logic unit composed of a CPU, a ROM, a RAM and a backup RAM etc.

The ECU 20 is connected with various sensors such as the airflow meter 5, the throttle position sensor 12, the accelerator position sensor 14, the rotary shaft position sensor 15 and the crank position sensor 16 mentioned above and an ambient barometric pressure sensor (not shown) via electric wiring, and output signals of these sensors are input to the ECU 20.

In a basic routine to be executed at regular time intervals, the ECU 20 reads in output signals of various sensors. In addition, the ECU 20 for example computes, at regular time intervals, the number of rotations of the rotary shaft 6c per minute (which will be referred to as the "turbo rotation speed" hereinafter) based on the frequency of the signal from the rotary shaft position sensor 15 and the number of rotations of the crankshaft per minute (which will be referred to as the "engine rotation speed" hereinafter) based on the frequency of the signal from the crank position sensor 16.

The ECU 20 is also connected with the actuator 9 and the electric motor 6d etc. via electric wiring, so that the ECU 20 can control the actuator 9 and the electric motor 6d etc.

In the supercharging system for an internal combustion engine having the supercharger equipped with an electric motor 6, the electric motor 6d is controlled so that the turbo rotation speed becomes a desired target turbo rotation speed.

Roughly speaking, a target rotation speed for the turbo rotation speed is computed, and if the current turbo rotation speed detected by the rotary shaft position sensor 15 is lower than the target rotation speed, it is judged that assist by the electric motor is needed, and the electric motor 6d is controlled in such a way that the turbo rotation speed becomes the target turbo rotation speed.

In the following, some methods of determining the target turbo rotation speed will be described.

(1) Optimum target turbo rotation speeds at various degrees of opening of the accelerator are computed on an empirical basis by, for example, experiments, and a map representing the relationship between the target turbo rotation speed and the degree of opening of the accelerator is prepared. The map may be arranged for example in such a way that the target turbo rotation speed for degrees of opening of the accelerator smaller than 30% is set to zero, the target turbo rotation speed for a degree of opening of the accelerator of 30% is set to 30,000 rpm, and the target turbo rotation speed is increased from 30,000 rpm in proportion to the degree of opening of the accelerator as the degree of opening of the accelerator becomes larger above 30%. A target turbo rotation speed is computed and set by substituting the degree of opening of the accelerator detected by the accelerator position sensor 14 into the above described map.

Figure 2:
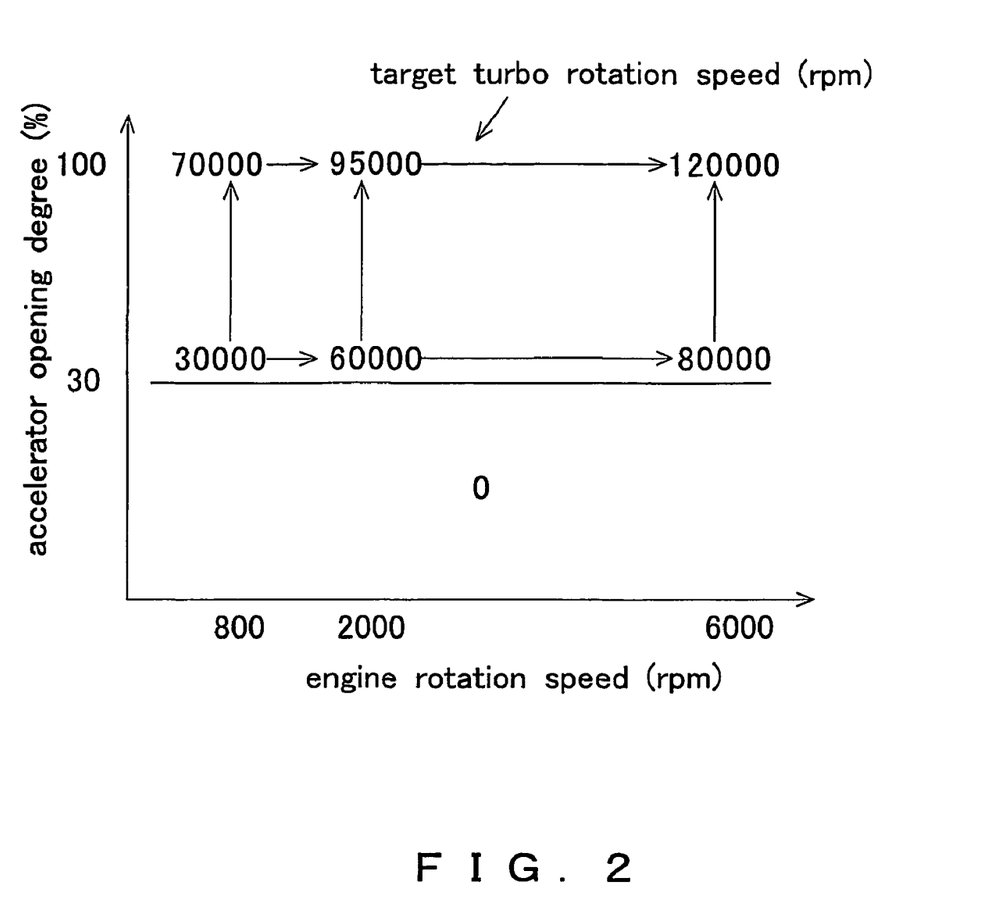
FIG. 2 shows relationship among the degree of opening of the accelerator, the engine rotation speed and the target turbo rotation speed.

(2) Optimum target turbo rotation speeds at various degrees of opening of the accelerator and various engine rotation speeds are computed on an empirical basis by, for example, experiments, and a map representing the relationship among the target turbo rotation speed, the degree of opening of the accelerator and the engine rotation speed as shown in FIG. 2 is prepared. A target turbo rotation speed is computed and set by substituting the degree of opening of the accelerator detected by the accelerator position sensor 14 and the engine rotation speed detected by the crank position sensor 16 into the above described map.

Figure 3:
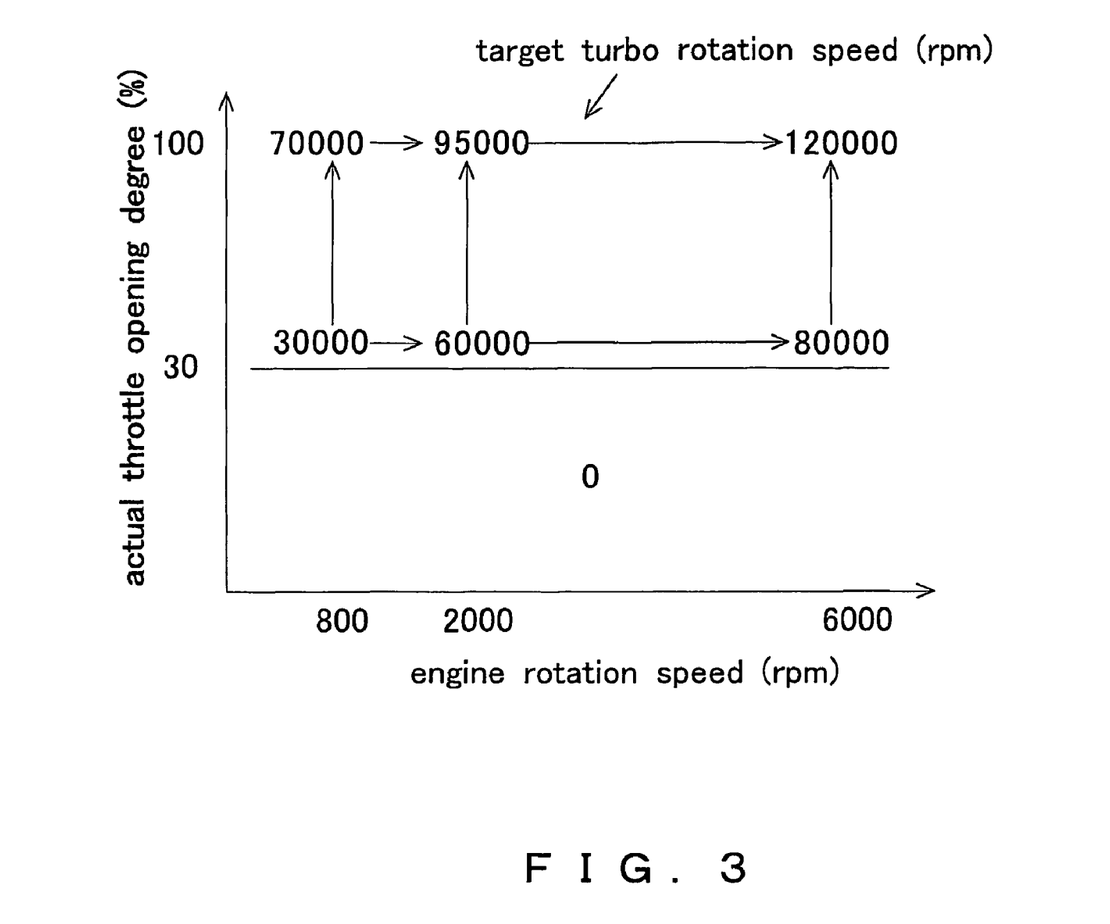
FIG. 3 shows the relationship among the actual degree of opening of the throttle, the engine rotation speed and the target turbo rotation speed.

(3) Optimum target turbo rotation speeds at various actual degrees of opening of the throttle and various engine rotation speeds are computed on an empirical basis by, for example, experiments, and a map representing the relationship among the target turbo rotation speed, the actual degree of opening of the throttle and the engine rotation speed as shown in FIG. 3 is prepared. A target turbo rotation speed is computed and set by substituting the actual degree of opening of the throttle detected by the throttle position sensor 12 and the engine rotation speed detected by the crank position sensor 16 into the above described map. The degree of opening of the accelerator is determined by the driver's will, but what is determinative for the engine is the degree of opening of the throttle, as gear shift and other vehicle controls are also concerned. Thus, it is possible to set an appropriate target turbo rotation speed in accordance with the engine condition with reference to the degree of opening of the throttle.

Figure 4:
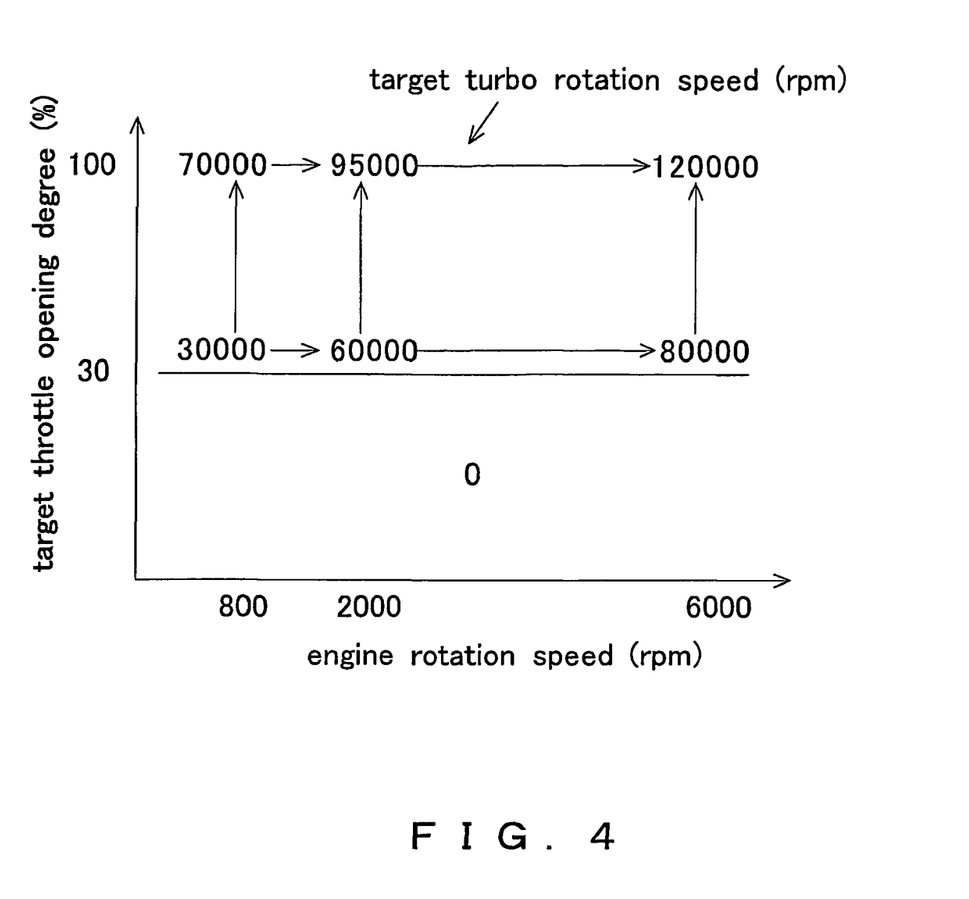
FIG. 4 shows the relationship among the target degree of opening of the throttle, the engine rotation speed and the target turbo rotation speed.

(4) Optimum target turbo rotation speeds at various target degrees of opening of the throttle and various engine rotation speeds are computed on an empirical basis by, for example, experiments, and a map representing the relationship among the target turbo rotation speed, the target degree of opening of the throttle and the engine rotation speed as shown in FIG. 4 is prepared. A target turbo rotation speed is computed and set by substituting the target degree of opening of the throttle, which is determined by the degree of opening of the accelerator detected by the accelerator position sensor 14 and the engine rotation speed detected by the crank position sensor 16, and the engine rotation speed detected by the crank position sensor 16 into the above described map. In method (3), the target turbo rotation speed is computed based on the actual degree of opening of the throttle. In transient periods, e.g. during acceleration, it takes a significant time for the actual degree of opening of the throttle to become equal to the target degree of opening of the throttle computed based on the degree of opening of the accelerator and the engine rotation speed. Therefore, by referring to the target degree of opening of the throttle, it is possible to more precisely set a target turbo rotation speed that is more optimum for the engine condition. However, after a significant time has elapsed, the actual degree of opening of the throttle is considered to be equal to the target degree of opening of the throttle, and therefore it is possible to compute the target turbo rotation speed more simply and faster based rather simply on the actual degree of opening of the throttle detected by the throttle position sensor and the engine rotation speed.

In the above-described maps for computing the target turbo rotation speed, faster acceleration can be achieved if a constant turbo rotation speed is set for each engine rotation speed when the degree of opening of the accelerator is larger than a specific degree, the actual degree of opening of the throttle is larger than a specific degree or the target degree of opening of the throttle is larger than a specific degree. However, it is possible to improve the drivability by increasing the target turbo rotation speed stepwise with an increase in the degree of opening of the accelerator, the actual degree of opening of the throttle or the target degree of opening of the throttle as shown in FIGS. 2 to 4.

In the above described maps prepared for computing the target turbo rotation speed, it is preferred that the target turbo rotation speed be set a few percent lower than the actual turbo rotation speed under stationary engine conditions at times when the turbo rotation is not assisted by the electric motor (at times when the electric motor is not operating). By this feature, it is possible to cause the electric motor to operate only when a turbo time lag occurs. Thus, it is possible to prevent excessive supercharge, excessive rotation and wasteful power consumption. In connection with the above, it is preferred that the percentage by which the target turbo rotation speed is set lower than the turbo rotation speed under stationary engine conditions (i.e. the above mentioned "a few percent") be set in such a way that if the turbo rotation speed has increased to that lower rotation speed, the turbo rotation speed is considered to be increased naturally by the exhaust gas energy and inertial force to the turbo rotation speed under stationary engine conditions.

Figure 5:
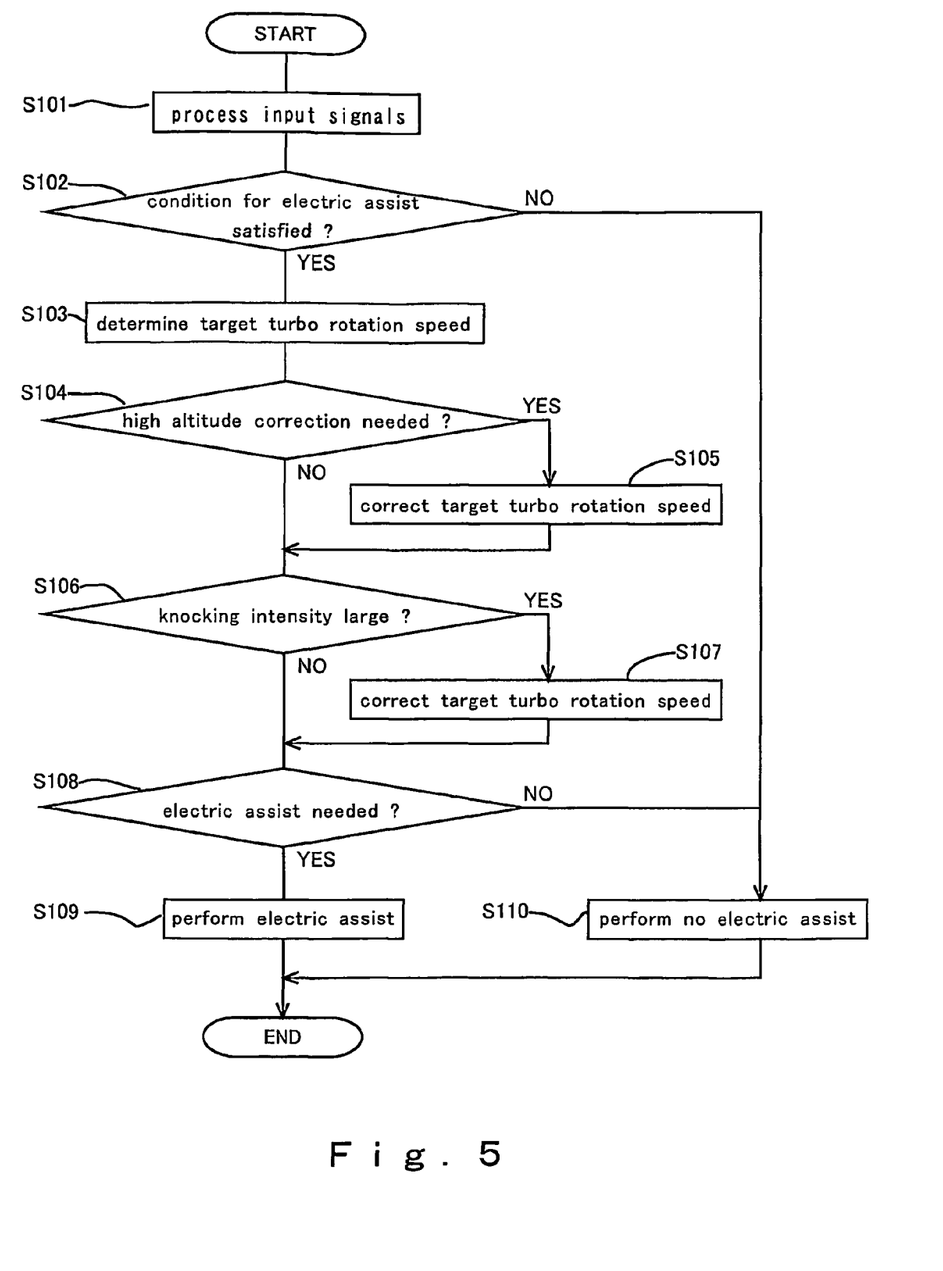
FIG. 5 is a flow chart of a control routine of an electric assist control according to the embodiment.

In the following, a control routine of the electric assist control according to this embodiment will be described specifically with reference to a flow chart shown in FIG. 5. This control routine is stored in the ROM of the ECU 20 in advance and executed by the ECU 20 at regular time intervals or executed as an interruption service routine triggered for example by input of a pulse signal from the crank position sensor.

Firstly in step S101 of this control routine, the ECU 20 processes input signals from the accelerator position sensor 14, the rotary shaft position sensor 15, the crank position sensor 16 and the air flow meter 5 etc.

After that, the process proceeds to step S102, where a determination is made as to whether or not a condition for performing electric assist is satisfied. The condition for performing electric assist may include, for example, that the temperature of the electric motor is not high, that the engine rotation speed is such a rotation speed at which operation of the supercharger is allowed, and that operation of the supercharger is not in a surge region. If an affirmative determination is made in this step, the process proceeds to step S103. On the other hand, if a negative determination is made, the process proceeds to step S110, and execution of this routine is terminated without performing electric assist.

In step S103, a target turbo rotation speed is set. It is set in accordance with any one of the above described methods (1) to (4).

Then the process proceeds to step S104, where a determination is made as to whether or not it is necessary to apply a high altitude correction on the target turbo rotation speed determined in step S103. In highlands, the oxygen concentration is lower than that in lowland. Therefore, at high altitudes, it is necessary to make the turbo rotation speed higher than the ordinary turbo rotation speed. In view of this, a determination is made in this step as to whether or not it is necessary to apply a high altitude correction, in other words, a determination is made as to whether the current altitude derived from a measurement value of the ambient barometric pressure sensor is higher than a predetermined altitude.

If an affirmative determination is made, namely, if it is determined that the current altitude is higher than the predetermined altitude and a high altitude correction is needed, the process proceeds to step S105, where the target turbo rotation speed is corrected. Specifically, when the current altitude is higher than the predetermined altitude, the target turbo rotation speed may be increased by a certain constant amount, or it may be variably increased in accordance with increases in the altitude.

On the other hand, if a negative determination is made in step S104, the process proceeds to step S106, where a determination is made as to whether the knocking intensity in the cylinder will become high if the target turbo rotation speed determined through the foregoing steps is set. Specifically, the current condition of the cylinder is grasped, for example by checking the temperature of the combustion chamber, based on the output values of various sensors, and a determination is made as to whether or not the knocking intensity will become higher than a predetermined value if the target turbo rotation speed determined through the foregoing steps is set under the current condition.

If the question is answered in the affirmative, the process proceeds to step S107, where the target turbo rotation speed is corrected. In doing so, the target turbo rotation speed may be decreased by a certain constant amount when the knocking intensity is larger than the predetermined value, or alternatively the rotation speed may be variably decreased with increases in the knocking intensity. The aforementioned predetermined value is determined on an empirical basis for example by experiments.

On the other hand, if the question in step S106 is answered in the negative, the process proceeds to step S108, where a determination is made as to whether electric assist is needed or not. Specifically, if the current turbo rotation speed is lower than the target turbo rotation speed determined through the foregoing steps, it is determined that electric assist is needed. If an affirmative determination is made, the process proceeds to step S109, where electric assist is performed so that the turbo rotation speed becomes the target turbo rotation speed determined in the foregoing steps. On the other hand, if a negative determination is made, the process proceeds to step S110, and execution of this routine is terminated without performing electric assist.

In the case where the target turbo rotation speed is determined in accordance with the above described method (4), the target degree of opening of the throttle is firstly determined upon acceleration based on the degree of opening of the accelerator and the engine rotation speed, the target turbo rotation speed is determined based on the target degree of opening of the throttle thus determined and the engine rotation speed using the map shown in FIG. 4, and assist by the electric motor 6 is performed so that the target turbo rotation speed is attained. Subsequently, after an appropriate time (a predetermined period of time) that allows the actual degree of opening of the throttle becomes equal to the target degree of opening of the throttle computed based on the degree of opening of the accelerator and the engine rotation speed has elapsed, it is preferred that the target turbo rotation speed be determined based simply on the actual degree of opening of the throttle detected by the throttle position sensor 12 and the engine rotation speed using the map shown in FIG. 3, since the actual degree of opening of the throttle is considered to have become equal to the target degree of opening of the throttle. In this case, it is preferred that the aforementioned appropriate time (the predetermined period of time) be derived for various running conditions of the internal combustion engine on an empirical basis for example by experiments, and the way of determining the target turbo rotation speed be switched in accordance with whether or not the aforementioned appropriate time (the predetermined period of time) has elapsed after electric assist was started.

While the invention has been described in terms of preferred embodiments, those skilled in the art will recognize that the invention can be practiced with modifications within the spirit and scope of the appended claims.

The invention claimed is:

1. A supercharging system for an internal combustion engine comprising:
    a supercharger equipped with an electric motor that performs supercharging utilizing the energy of the exhaust gas of the internal combustion engine mounted on a vehicle, wherein rotation of the rotary shaft of the supercharger is selectively assisted by the electric motor; and
    a control unit for controlling assisting force of said electric motor in such a way that the rotation speed of the supercharger becomes a target rotation speed,
    wherein said control unit determines the target rotation speed of said supercharger based on the degree of opening of an accelerator provided on said vehicle or on the degree of opening of the accelerator and the rotation speed of the internal combustion engine and controls said assisting force in such a way that the target rotation speed is attained, and
    said control unit detects a knocking intensity occurring in a cylinder of the internal combustion engine and corrects said target rotation speed based on the knocking intensity.

2. A supercharging system for an internal combustion engine comprising:
    a supercharger equipped with an electric motor that performs supercharging utilizing the energy of the exhaust gas of the internal combustion engine mounted on a vehicle, wherein rotation of the rotary shaft of the supercharger is selectively assisted by the electric motor; and
    a control unit for controlling assisting force of said electric motor in such a way that the rotation speed of the supercharger becomes a target rotation speed,
    wherein said control unit determines the target rotation speed of said supercharger based on the degree of opening of an accelerator provided on said vehicle or on the degree of opening of the accelerator and the rotation speed of the internal combustion engine and controls said assisting force in such a way that the target rotation speed is attained,
    said control unit makes said target rotation speed lower than the rotation speed of the supercharger in the state in which the internal combustion engine is running stationarily without assist by said electric motor, and
    a percentage by which said target rotation speed is made lower than the rotation speed of the supercharger in the state in which the internal combustion engine is running stationarily without assist by said electric motor, is set in such a way that if the rotation speed of the supercharger is increased to that of the lower rotation speed, the rotation speed of the supercharger is considered to be increased naturally by the exhaust gas energy and inertial force, up to the rotation speed of the supercharger in the state in which the internal combustion engine is running stationarily without assist by said electric motor.

* * * * *